No. 649,294. Patented May 8, 1900.
G. W. GALLAWAY.
OIL FILTER.
(Application filed Mar. 15, 1900.)
(No Model.)
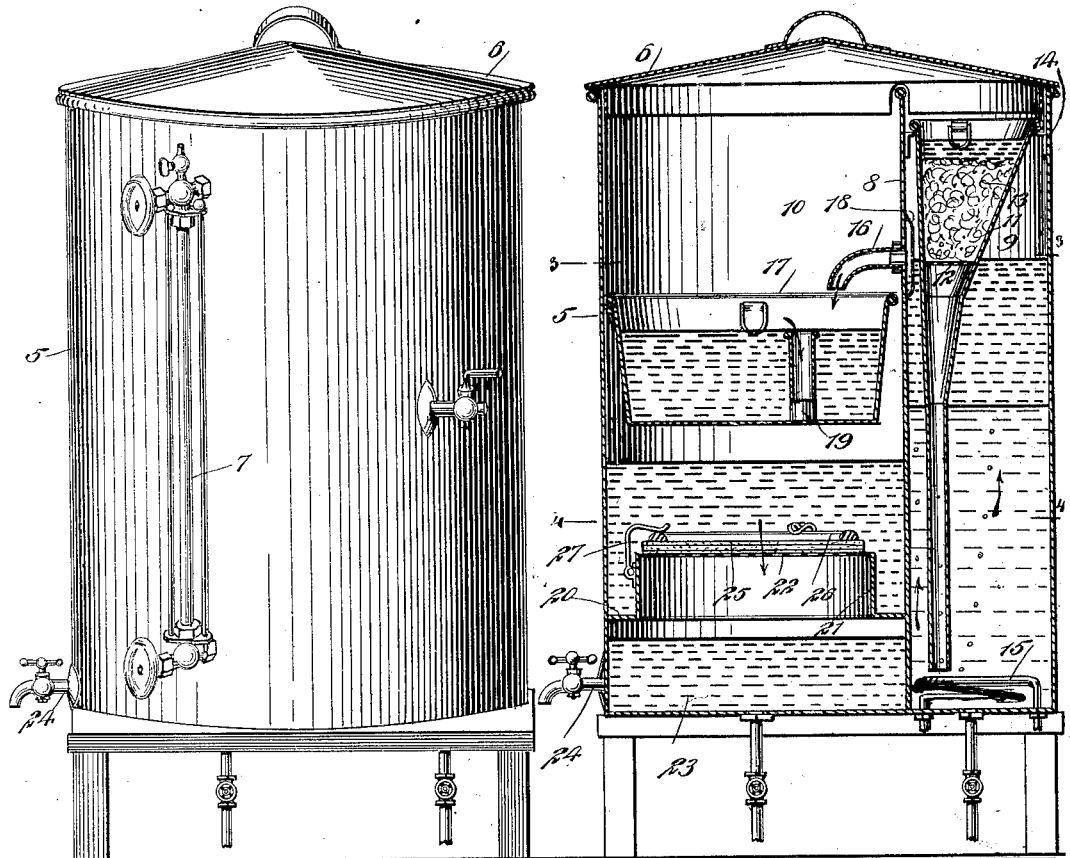
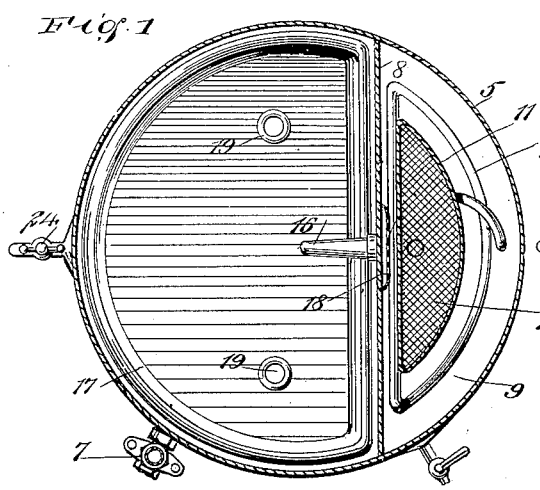
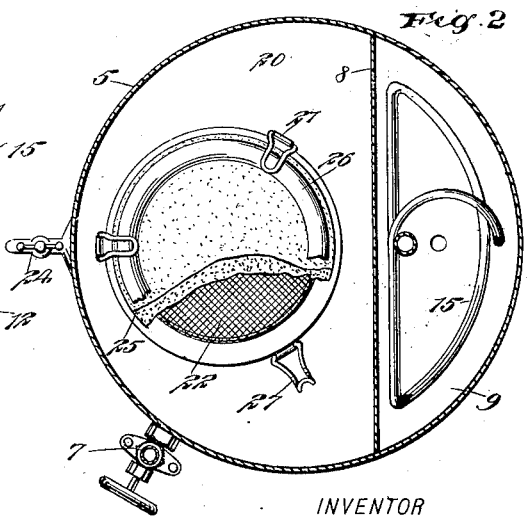
WITNESSES: INVENTOR
G. W. Gallaway
BY
ATTORNEYS

UNITED STATES PATENT OFFICE.

GEORGE W. GALLAWAY, OF RYE, NEW YORK.

OIL-FILTER.

SPECIFICATION forming part of Letters Patent No. 649,294, dated May 8, 1900.

Application filed March 15, 1900. Serial No. 8,770. (No model.)

*To all whom it may concern:*

Be it known that I, GEORGE W. GALLAWAY, a citizen of the United States, and a resident of Rye, in the county of Westchester and State of New York, have invented a new and Improved Oil-Filter, of which the following is a full, clear, and exact description.

This invention relates to improvements in devices for filtering oil, such as waste oil or that class of oil that drops from bearings and is caught in pans; and the object is to provide a filter by means of which such oil may be readily and economically separated from gathered impurities—such as iron-filings, dirt, grit, and the like—thus rendering the oil again valuable as a lubricant.

I will describe an oil-filter embodying my invention and then point out the novel features in the appended claims.

Reference is to be had to the accompanying drawings, forming a part of this specification, in which similar characters of reference indicate corresponding parts in all the figures.

Figure 1 is a perspective view of a filter embodying my invention. Fig. 2 is a vertical section thereof. Fig. 3 is a section on the line 3 3 of Fig. 2, and Fig. 4 is a section on the line 4 4 of Fig. 2.

The filter comprises a body portion 5, having a cover 6, upon the outer portion of which is a gage-glass 7. The body portion is divided by a vertical partition 8, providing a chamber 9 for containing water and a precipitating-chamber 10. Removably placed in the water-chamber is a funnel 11, the stem portion of which extends nearly to the bottom of said water-chamber, as plainly indicated in the drawings. In this funnel is placed a gauze material 12, and within the funnel, above the gauze, I place cotton or similar material 13. The funnel is supported by having its flanged upper end engaging with brackets 14, secured to the walls of the chamber. A heating-coil 15 is arranged in the lower portion of the chamber and through which a heating medium, such as steam, may be passed when it is found desirable to warm or heat water contained in the chamber.

An outlet-spout 16 leads from the chamber 9 and is designed to discharge into a receiving and precipitating pan 17, removably placed in the chamber 10. At the inner end of this outlet-spout 16 is a gauze material 18. Discharging-tubes 19 lead through the bottom of the pan 17 and extend nearly to the top thereof, as plainly shown in Fig. 2. Arranged in the lower portion of the chamber 10 is a flooring or platform 20, having an upwardly-extended cylindrical flange portion 21, at the upper end of which is a gauze material 22. Below this flooring 20 is a chamber 23 for receiving the purified or filtered oil, which may be drawn therefrom through a cock 24.

I place on the gauze 22 one or more layers 25 of felt or similar material. These felt pads are held in place by a metal ring 26, bearing upon the edge portion of the upper pad. This ring is removably held in place by clamping-hooks 27, having swinging connection with the flange 21 and adapted to engage over the upper surface of the ring, as plainly indicated in Fig. 2.

In operation the oil containing foreign matter from which it is to be cleansed is placed in the funnel 11. As it passes downward through the cotton 13 the larger particles will be held by said cotton. Then the oil which may contain foreign matter not retarded by the cotton will pass through the gauze 12 and discharge into the water contained in the chamber 9. The heavy material will be precipitated or fall to the bottom of said chamber, while the oil will pass up through the water and gather on the top. As before stated, the water may be heated by the coil 15. The oil thus passing through the water will be washed and practically cleansed of light impurities that may be carried therewith. The oil rising to the surface of the water will pass through the gauze 18 and then through the spout 16 and discharge in the pan 17, where heavy particles that may still remain in the oil will be precipitated and the light oil will flow over the top of the tubes 19 and discharge upon the felt pads 25. The space around the flange 21 provides a precipitating-chamber for any heavy matter that may be carried with the oil from the pan 17. The oil passing through the pads 25 and the gauze 22 will be thoroughly cleansed and purified before passing into the chamber 23.

It may be here stated that the chamber 9 should be but half-filled with water before oil is poured into the funnel.

By providing the several series of precipitating-chambers and the several series of strainers it is obvious that after a complete operation the oil will be entirely cleansed of its impurities, making it again useful for lubricating purposes. It is to be understood, however, that this filter may be employed for other purposes than that of filtering lubricating-oil—that is, it may be used for filtering hydrocarbon oils or the like.

Having thus described my invention, I claim as new and desire to secure by Letters Patent—

1. A filter, comprising a body portion divided into a water-chamber and a precipitating-chamber, a funnel removably arranged in the water-chamber and having its stem portion extended nearly to the bottom thereof, a filtering material arranged in the funnel, a precipitating-pan removably arranged in the precipitating-chamber, means for directing oil through the water-chamber to said pan, an outlet-tube extended from near the top of said pan and through its bottom, and a filtering device below said pan and above a chamber for receiving the filtered material, substantially as specified.

2. An oil-filter, comprising a body portion, a vertical partition in said body portion providing a water-chamber and a precipitating-chamber, a spout leading through said partition, a gauze over the inner end of said spout, a funnel arranged in the water-chamber and extended nearly to the bottom thereof, a filtering material in the funnel, a precipitating-pan arranged in the precipitating-chamber, outlet-tubes extended through the bottom of said pan and nearly to the top thereof, and filtering-pads arranged below the pan and above a chamber for receiving the filtered oil, substantially as specified.

3. An oil-filter, comprising a body portion, a partition extended vertically therein, whereby a water-chamber and a precipitating-chamber are provided, a funnel removably arranged in the water-chamber, a heating device in said water-chamber, a precipitating-pan arranged in the precipitating-chamber and adapted to receive oil from the water-chamber, outlet-pipes leading through the bottom of said pan, a flooring or false bottom arranged in the lower portion of the precipitating-chamber, an upwardly-extended flange on said false bottom, a gauze material on the top of said flange through which oil may pass to a chamber beneath, and a pad of felt or the like held on said gauze, substantially as specified.

4. In a filter, a water-chamber and a precipitating-chamber having communication one with the other near the upper portion, a false bottom arranged in the lower portion of the precipitating-chamber and above a chamber for filtered oil, an upwardly-extended flange on said false bottom, a gauze attached to the upper end of said flange, a filtering-pad adapted to be placed on said gauze, a ring for engaging upon the edge of said pad, and clamping devices mounted to swing on the flange and to engage with said ring, substantially as specified.

5. In a filter, a water-chamber and a precipitating-chamber having communication one with the other near the upper portion, a false bottom arranged in the lower portion of the precipitating-chamber and above a chamber for filtered oil, an upwardly-extended flange on said false bottom, a gauze attached to the upper end of said flange, a filtering-pad adapted to be placed on said gauze, a ring for bearing upon the edge of said pad, and clamping devices consisting of hooks mounted to swing on the flange and to engage with said ring, substantially as specified.

In testimony whereof I have signed my name to this specification in the presence of two subscribing witnesses.

GEORGE W. GALLAWAY.

Witnesses:
JNO. M. RITTER,
C. R. FERGUSON.